3,663,485
PROCESS FOR THE PRODUCTION OF BINDERS
FOR AQUEOUS COATINGS
Bernhard Broecker, Hamburg, Germany, assignor to Reichhold-Albert-Chemie Aktiengesellschaft, Hamburg, Germany
No Drawing. Filed Nov. 16, 1970, Ser. No. 90,094
Claims priority, application Switzerland, Nov. 17, 1969, 17,041/69
Int. Cl. C08g 37/18; C09d 3/52
U.S. Cl. 260—19 EP
5 Claims

ABSTRACT OF THE DISCLOSURE

The invention consists of a method of making a binder for aqueous coatings based on plasticized, neutralized resins I and heat-curing, water-soluble on at least hydrophilic, low-molecular aldehyde condensation products II. The plasticized resins I are new polyetherester resins with valuable properties. The heat-curing, water-soluble or at least hydrophilic, low-molecular aldehyde condensation product II are known in the art.

BACKGROUND OF THE INVENTION

Synthetic resins based on esters of fatty acids and compounds containing epoxide groups have been found extremely satisfactory as binding agents for surface protection (see Paquin, Epoxide Compounds and Epoxide Resins, Page 416, Springer Verlag, Berlin, Göttingen, Heidelberg 1958).

The present invention is concerned with making binders for aqueous coatings on the basis of water-soluble vinyl-modified polyether esters and water-soluble or at least hydrophilic low-molecular aldehyde condensation products. Earlier binders capable of being thinned with water have the great disadvantage that they are not stable when stored in aqueous solution. The pH value of the neutralized products drifts into the acid range during storage, whereby components that are insoluble in water are formed.

The aim of this invention is to make available water-soluble binders of this type which are distinguished by extreme stability in the alkaline medium and can be made relatively economically.

SUMMARY OF THE INVENTION

The invention consists of a method of making a binder for aqueous coatings based on plasticized, neutralized resins I and heat-curing, water-soluble or at least hydrophilic, low-molecular aldehyde condensation products II, characterised in that a component I is producted by reaction of:

(a) Compounds which contain epoxide groups and which may also contain hydroxyl groups and are represented by the general formula

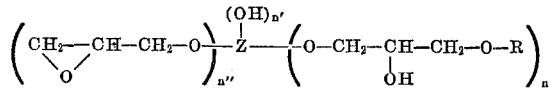

wherein (I) Z means an alkyl, aryl or cycloalkyl residue and $n$ has the value zero and $n''$ the value 1 or 2 or 3, and $n'$ can assume the values zero, 1 or 2 or (II) Z means an alkyl, aryl or cycloalkyl residue and $n$ and $n''$ have the value 1, R representing an alkyl residue with 1 to 6 C atoms, or (III) Z means the residue of the following formula

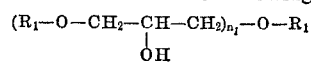

when $n$ has the value zero and $n''$ the value 2, $R_1$ representing an aliphatic or aromatic divalent residue and $n_1$ meaning zero or a small number between 1 and 5, are etherified with (b) Saturated primary and/or secondary monohydric alcohols with 3 to 20 C atoms by heating, in the presence of catalysts if required, and (c) The etherification products are esterified with an unsaturated aliphatic monocarboxylic acid with 6 to 20 C atoms which preferably contains a plurality of ethylenic double bonds, or with a mixture of such acids, and (d) The esterification products are (with the hydroxyl groups blocked with acid anhydrides or with mono- and/ or polyisocyanates, if required) reacted by heating with such quantities for $\alpha,\beta$-ethylenically unsaturated mono- and/or polycarboxylic acids and, if they exist, anhydrides of these acids and/or semiesters obtained by reaction of these acids with monoalcohols having 1 to 4 C atoms, in the presence of other vinyl or vinylidene compounds if required, the reaction products having an acid value of at least 25, and (e) The reaction products containing carboxylic groups are subsequently treated with such quantities of ammonia and/or strong organic nitrogen bases that the products are completely or partly neutralised and are sufficiently capable of being dispersed in water or thinned with water.

Swiss Patent specifications 456,814 and 466,580 describe stoving lacquers capable of being thinned with water which are made by a process in which products of reactions of between epihalogenhydrins and polyphenols, which are free from epoxides, are made to react with anhydrides of di- or polybasic organic acids. In this process, however, the carboxylic groups which are necessary for solubility of the products in water are not present during polymerization but are introduced by esterification. Contrary to this, the component I of the present invention contains the carboxylic groups in a polymerized form, which leads to a substantial improvement in the resistance of these products to saponification, so that the carboxyl groups are combined with the resin molecule via a carbon-carbon-bond.

U.S. Pat. specification 3,293,201 describes a water-soluble air-drying binding agent which is obtained by reaction of an oleo-maleic acid anhydride adduct with the ester of an epoxide resin with an unsaturated fatty acid. This product also is insufficiently stable in an alkaline aqueous solution. Contrary to this the binders of the present invention are distinguished by very great stability in alkaline aqueous solution.

PREFERRED EMBODIMENTS OF THE INVENTION

Compounds which contain epoxide groups and may also contain hydroxyl groups and are suitable for the synthesis of the component I are expoxidated olefines, diolefines and oligoolefines such as 1,2,5,6-diepoxyhexane and 1,2,4,5-diepoxyhexane. Polyethers with epoxy groups as obtained by etherification of a dihydric alcohol or diphenol with epihalogenhydrins or dihalogenhydrins, for instance epichlorohydrin or dichlorhydrin, in the presence of alkali are very suitable. These compounds are derived from glycols such as ethylene glycol, diethylene glycol, triethylene glycol, propylene glycol-1,2,propylene glycol-1,3, butylene glycol-1,4, pentane diol-1,5, hexane diol-1,6, and more particularly from diphenols such as resorcinol pyrocatechine, hydroquinone, 1,4-dihydroxynaphthalene, bis-(4-hydroxy-phenyl)-methane, bis-(4-hydroxyphenyl)-methyl-phenylmethane, bis - (4 - hydroxy-phenyl-toluyl)-methane, 4,4 - dihydroxy-diphenyl and 2,2-bis-4-hydroxyphenyl-propane. The compound in the form of polyethers which contain epoxide groups are represented by the following general formula

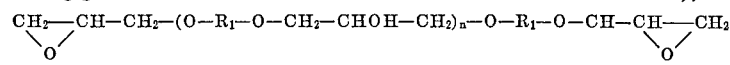

In this formula $R_1$ means an aliphatic or aromatic carbon residue and $n$ means zero or a small number, for instance 1 to 5.

Polyethers containing epoxide groups are represented by the general formula

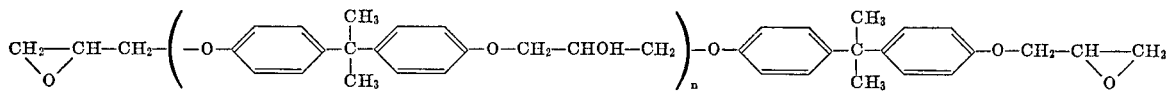

and based on 2,2-bis-(4-hydroxy-phenyl)-propane as the starting compound, are of particular importance; of these, those polyethers which have a molecular weight between about 380 and about 3500 are preferably used.

Saturated primary and/or secondary monoalcohols are used for etherifying these compounds containing epoxide groups.

Suitable saturated alcohols are for instance methanol, ethanol, propanols, butanols, pentanols, hexanols, heptanols, octanols and nonanols. The preferred alcohols are primary alcohols; of these, ethanol, propanol and butanol are preferred. Tertiary monoalcohols are not suitable for this reaction.

In this operation the etherification is carried out by heating preferably in the presence of usual catalysts in such a manner that the hydroxyl groups of the saturated monoalcohols are in excess over the epoxide groups of the epoxide containing compounds. When the saturated monoalcohols are volatile it is advisable to operate with a very considerable excess of about 2 hydroxyl groups up to 20 hydroxyl groups per epoxide group, favoured 10–20 hydroxyl groups per epoxide group in the reaction, and then to remove the excess of unreacted saturated alcohol, for instance by distillation. In the case of non-volatile saturated alcohols it is advantageous to make the excess not so high. In this case however there should be at least 1.2 hydroxyl groups of the saturated monoalcohols for each epoxide group. In principle it is in fact also possible to operate with quantitative relationships between the saturated alcohols and the compounds containing epoxide groups such that one epoxide groups is used for each hydroxyl group of the saturated monoalcohol or the epoxide groups are present even in excess over the hydroxyl groups of the saturated monoalcohol in some case. But in the case of quantitative relationships of the last-mentioned kind very highly viscous products are generally obtained and the danger that the resins may form a gel is not excluded with sufficient certainty.

Etherification is carried out by heating the above-mentioned components $a$ and $b$ to temperatures between about 40 and about 150° C.; the temperature range from 60 to 120° C. is preferred. Known etherification catalysts are preferably used in the operation such as boron trifluoride adducts, for instance boron trifluoride diethylether, organic tin compounds such as dibutyl tin dilaurate and strong organic bases, for instance trimethyl benzyl ammonium hydroxide, are examples of catalysts which can be used for this purpose.

The etherification products obtained in this reaction must be still soluble in organic solvents such as methyl isobutyl ketone, xylene, toluene and glycol ethers such as butyl glycol and isobutyl glycol. The etherification can be carried out in the absence of solvents, but the presence of inert organic solvents is permissible.

The polyethers thus obtained are subsequently esterfied with unsaturated aliphatic monocarboxylic acids which have 6 to 20 C atoms and preferably contain several ethylenic double bonds. Suitable unsaturated aliphatic carboxylic acids are straight chain unsaturated fatty acids with 10 to 20 carbon atoms such as palmitoleic acid, petroselinic acid, oleic acid, eladic acid, 9,12-linoleic acid, 9,11-linoleic acid (in the cis, cis-trans and trans-trans form), linolenic acid, eleostearic acid, lignoceric acid, erucic acid, arachidonic acid, clupanodonic acid, α- parinaric acid, α-licanic acid and anhydrides thereof; one of these or a mixture of more than one may be used. Fatty acid mixtures as obtained from natural vegetable and animal fats such as cottonseed oil, peanut oil, wood oil, maize oil, oiticica oil, olive oil, poppy-seed oil, isano oil, olive kernel oil, perilla oil, rape oil, sunflower oil, walnut oil, grapeseed oil, sardine oil, herring oil, menhaden oil, whale oil and more particularly linseed oil, soy bean oil and safflower oil, are preferably used.

It is also possible to use commercial fatty acids, more particularly tall oil fatty acids, chemically treated fatty acids or fatty acids from chemically treated fats, more particularly dehydrated castor oil fatty acids, or conjugated fatty acids treated by catalytic methods, fatty acids from catalytically conjugated fats, more particularly conjugated linseed oil, soy bean oil and safflower oil fatty acids, fatty acids elaidinated by catalytic methods or fatty acids from elaidinated fats.

Excellent results are obtained with what are known as commercial linoleic acids which are obtained by distillation and are distinguished by a high linoleic acid content (more than 50 percent by weight), a small saturated fatty acid content (less than 10 percent by weight), and only a very small linolenic acid content (less than 2 percent by weight).

The esterification is carried out by heating; in this operation the removal of the reaction water can be accelerated by the addition of carrier agents such as xylene, toluene or benzene or by operation under reduced pressure such as for instance boron trifluoride or in the presence of known esterification catalysts as Friedel-Crafts catalysts such as for instance boron trifluoride or in the presence or organic tin compounds such as dibutyl tin dilaurate. The quantity of monocarboxylic acids is so chosen that the equivalent ratio of the carboxylic groups of the monocarboxylic acids to the hydroxyl groups of the epoxide resin ether amounts to between 0.5 and 0.9. The esterification is continued until the acid value has reached about 5.

The fatty acid content in the end product should be not less than 20% by weight and not more than 60% by weight; the preferred range is between 25 and 55% by weight.

The polyether esters thus obtained are subsequently copolymerized with α,β - ethylenically unsaturated mono- and/or polycarboxylic acids while hot. In this operation it is also possible to copolymerize a mixture of these substances with other vinyl or vinylidene monomers which contain no carboxyl groups. Vinyl monomers which contain no carboxyl groups and can be used in the copolymerization process are alkyl esters of α,β-unsaturated monocarboxylic acids, such as methyl acrylate, ethyl acrylate, propyl acrylate, n-butyl acrylate, octyl acrylate, 2-ethylhexyl-acrylate, decyl acrylate, lauryl acrylate and the corrdesponding methyl, ethyl and phenyl acrylates, propyl crotonate, butyl crotonate and the like. It is also possible to use hydroxyalkyl esters, of α,β-unsaturated carboxylic acids, such as 2-hydroxyethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates and phenyl acrylates, 2-hydroxyethyl maleate, di-(2-hydroxypropyl)-maleate and the corresponding fumarates, 2-hydroxy-3-chloropropyl acrylate, 2-hydroxy-1-phenylethyl acrylate, 2-hydroxy-3-butoxypropyl acrylate and the corresponding ethacrylates and phenyl acrylates but there are still other copolymerizable vinyl and vinylene compounds, such as styrene, nucleus-substituted styrenes and side-chain substituted styrenes such as α-methyl styrene, α-ethyl styrene and α-chlorostyrene, which can be used. Of these monomers, those that are preferably used are methyl acrylate, methyl methacrylate, ethyl acrylate, ethylmethacrylate, 2-hydroxyethyl acrylate, 2-hydroxypropyl acrylate and styrene, α-methyl styrene and vinyl toluene; one of these or a mixture of more than one may be used.

Suitable copolymerizable monomers containing carboxylic groups are acrylic acid, methacrylic acid, cinnamic acid, β-benzoyl acrylic acid and crotonic acid; also, $\alpha,\beta$-ethylenically unsaturated polycarboxylic acids, and anhydrides of these when such anhydrides can be formed, such as maleic acid, fumaric acid, citraconic acid, itaconic acid, mesaconic acid and aconitic acid, monoesters of the aforesaid polycarboxylic acids with saturated straight chain monoalcohols with 1 to 4 carbon atoms, preferably methanol, maleic monomethyl ester and halogen-substituted acids such as chloromaleic acid and the like. Preferred $\alpha,\beta$-ethylenically unsaturated carboxylic acids are acrylic acid, methacrylic acid, maleic acid anhydride, maleic acid and fumaric acid.

One of the copolymerizable monomers containing carboxylic groups, a mixture of more than one of these monomers, a mixture of one of these monomers with the initially mentioned monomers containing no carboxylic groups or a mixture of more than one with those containing no carboxylic groups, may be made to react with the ether ester from Stage(c).

Another copolymerizable monomer such as acrylamide, methacrylamide, acrylonitrile, methacrylonitrile and the like, or a mixture of more than one of these, may be introduced as an additive into the monomer mixture. The vinyl and/or vinylidene content in the synthetic resin depends on the intended range of use of the binding agent. But this content should generally be not less than 10% by weight, with respect to the weight of the end product. End products containing 10 to 30% by weight of copolymerized vinyl and/or vinylidene compounds are particularly suitable for lacquer coating media applied by the electrophoretic application method. In binding agents of this kind it is necessary to make very sure that the copolymerization with the additional polymerizable monomers is complete. If the residual monomer content is too high, difficulties may arise in deposition and in regard to pigment compatibility. Binding agents containing 30 to 50% by weight of copolymerized vinyl or vinylidene compounds are particularly suitable as air-drying coating materials. If copolymerization with $\alpha,\beta$-ethylenically unsaturated monocarboxylic acids is carried out, then in this case larger proportions of vinyl and/or vinylidene compounds without carboxylic groups are preferably used in conjunction with these. The proportion of $\alpha,\beta$-unsaturated monocarboxylic acids should generally not be more than 30% by weight with respect to the monomer mixture, because otherwise the end products that are produced tend to form gels and precipitations can occur relatively readily during manufacture.

In the copolymerization of $\alpha,\beta$-ethylenically unsaturated dicarboxylic acids or partial esters of these, the reaction can also be carried out satisfactorily without the additional use of vinyl and/or vinylidene compounds containing no carboxylic groups. It is advantageous, however, more particularly when the dicarboxylic acids that are used are relatively strong acids, i.e. have pK values less than 4, to block all the hydroxyl groups of the polyether ester before the reaction with the polyethers, because otherwise esterification during the copolymerization process is not to be excluded. This blocking of the hydroxyl groups can be effected by reaction with acid anhydrides for instance such as acetic anhydride or the like or by reaction with mono and/or polyisocyanates, for instance toluylene diisocyanates, which react readily with hydroxyl groups. This danger does not arise when less strongly acid $\alpha,\beta$ - ethylenically unsaturated carboxylic acids are used. The reaction of the polyether esters with the monomers containing the carboxylic groups for the purpose of copolymerization takes place at elevated temperature, preferably under the action of known polymerization catalysts, however, a heat polymerization in the absence of catalysts may for special purpose be advantageous. The reaction temperatures depend on the catalyst system used. Reaction temperatures between 120° and 180° C. are preferred in which case ditertiary butyl peroxide is used and may be combined with chain breakers, preferably lauryl mercaptan. If low temperatures, for instance about 120° C., are used, the reaction mixture is often too highly viscous for easy working. Also, the reaction speed, which can be followed by observing the solid content, is very low in the case of many monomers. If high temperatures, for instance above 180° C., are used, products with a low viscosity are obtained even by purely thermal copolymerization. It is advantageous, more particularly when $\alpha,\beta$-ethylenically unsaturated dicarboxylic acids or anhydrides of these are used, to carry out the copolymerization without the use of a polymerization catalyst and purely by thermal action at 180° to 220° C. The reaction speed can be increased by the addition of cobalt (II) salts, for instance cobalt (II) chloride, in quantities of 3 to 6 parts per million. But the same reaction time is also achieved by the presence of stainless steel material. The reaction can also be carried out in suitable solvents. Suitable solvents for this purpose are water-soluble solvents, more particularly ethers of ethylene glycol such as ethylene-glycol-monoethylether, ethylene-glycol-monoisopropyl-ether or ethylene - glycol - monobutylether, but the resins made in these should be used only for the preparation of such coating media as are applied by mechanical means, for instance by spreading, spraying, dipping, rolling, brushing and the like. Solvents that are not water miscible for instance aromatic solvents such as xylene, toluene or benzene, can in fact also be used, but generally they must be removed after the completion of the reaction. These solvents are preferred in the case of polymerization for the preparation of resins for electrophoretic deposition.

The viscosities of the compound I when measured in a 1:1 by weight butyl glycol solution at 20° C. should be between 95 and 800 cp. This can be achieved firstly by suitable selection of the monomer mixture and also by control of the viscosity by the temperature and by the use of suitable solvents. The viscosity can also be further controlled by the addition of what are known as regulators as already explained previously. The reaction products are then converted to their salts by the addition of ammonia and/or strong organic nitrogen bases such as for instance trimethyl amine, triethanol amine, triisopropanol amine, diglycol amine, diethyl amine, piperidine, morpholine, diethanol amine, n-dimethylethanol amine, n-methylethanol amine and the like. The expression "strong organic nitrogen bases" is to be understood to include secondary or tertiary amines which attain a pH value of at least 9 in a 50% by weight aqueous solution. It is not necessary to neutralise the carboxylic groups of the reaction products completely; it is sufficient to add as much ammonia and/or amine as will make the products at least capable of being thinned with water. It is advantageous to carry out the operation of thinning with water in the presence of what are known as hydrophilic solvents. Suitable hydrophilic solvents for this purpose are ethers of ethylene glycol such as ethylene-glycol-monoethyl-ether, ethylene - glycol - monoisopropyl - ether and ethylene-glycol-monobutyl-ether, and ethers of diethylene glycol such as diethylene glycol diethyl ether and diethylene glycol dimethyl ether, and also alcohols such as methanol, ethanol, propanols, butanols, secondary butanol, tertiary butanol and also ketone alcohols such as diacetone alcohol.

The component I produced in accordance with the invention can be used together with heat-curing, water-soluble or at least hydrophilic low molecular aldehyde condensation products II as a binder for aqueous coatings in form of stoving lacquers. A preferred use of the new polyether resins (component I) consists in their employment mixed with component II in electrophoretically depositable coating materials.

Under heat-curing hydrophilic low molecular aldehyde condensation products (component II) are to be understood such condensation products which sole heated attain however, a relatively high-molecular yet not unmeltable state. It is not absolutely necessary that the added condensation products show watersolubility alone. It is however, necessary that their hydrophilic character is sufficient to show sufficient compatibility in combination with the new water-soluble polyether ester acid resins acting as plasticizers that means stoved clear lacquers must be homogeneous and in the aqueous coating there must not occur a separation of the binder.

Examples of suitable heat-hardenable hydrophilic low-molecular aldehyde condensation products (component II) are phenol alcohols and phenol polyalcohols, that is to say products which still have a low-molecular weight and are obtained by condensation of mono- or polyhydric phenols with aldehydes such as formaldehyde, acetaldehyde, crotonic aldehyde, acrolein, benzaldehyde, furfurol and the like or compounds supplying formaldehyde such as paraformaldehyde, paraldehyde or trioxymethylene. A preferred aldehyde is formaldehyde or a compound which supplies formaldehyde and is obtained in an alkaline medium in a known way, for instance hexamethylene tetramine. Suitable phenols are phenol and phenols such as cresol or xylenol which are substituted in the o- or o'- and p-positions but are condensable with formaldehyde. Resols obtained from alkyl phenols such as propyl, butyl and more particularly p-tertiary butyl phenol, are very suitable. Resols from bicyclic phenols such as diphenol and Bisphenol A are also suitable. These resols based on Bisphenol A which have about 1.75 to 2.5 moles of formaldehyde per mole of Bisphenol A are particularly suitable. Phenolic resin carboxylic acids obtained by condensation of formaldehyde or compounds supplying formaldehyde with suitable phenol carboxylic acids can also be very satisfactorily used as resol. 4,4-bis(4-hydroxyphenyl)-valerianic acid and 4,4-bis(4-hydroxyphenyl)-acetic acid occupy a preferred position among the phenol carboxylic acids which are capable of condensation with formaldehyde. In this case also the best results are obtained if the compound contains 1.75 to 2.5 moles of formaldehyde per mole of phenol carboxylic acid. The manufacture of other suitable phenol carboxylic acid resols is described for instance in German Pat. publication 1,113,775. Phenol carboxylic acid resols, particularly those based on 4,4-bis(4-hydroxyphenyl)-valerianic acid and 4,4-bis(4-hydroxyphenyl)-acetic acid are very suitable for combination for the binders of this invention which are intended for use as electrophoretically depositable coating materials and lacquers. It is very advantageous to etherify at least a part of the formaldehyde condensation products with low monohydric aliphatic alcohols with 1 to 4 C atoms, such as ethanol, methanol, propanole or butanols. Preferred water-thinnable phenol resols are those which are obtained by reaction of phenol and aldehyde condensation products, etherified with alcohol, with aliphatic monoxy- or dioxycarboxylic acids or esters of these and are described in Belgian patent specification 724,923 of Dec. 4, 1968, respectively in the French patent specification 1,596,804 of June 22, 1970.

Suitable heat-hardenable hydrophilic low-molecular aminoplast-forming condensation products (component II) are aldehyde reaction products of such compounds capable of reacting with aldehydes such as urea, ethylene urea, dicyandiamide and aminotriazines such as melamine, benzoquanamine, acetoguanamine and formoguanamine.

The abovementioned compounds may be reacted with aldehydes such as formaldehyde, acetaldehyde, crotonic aldehyde, acrolein, benzaldehyde, furfurol and the like. The term "aldehydes" is to be understood to include aldehyde-forming compounds such as paraformaldehyde, paraldehyde and trioxymethylene. The preferred aldehyde is formaldehyde; preferred compounds combining with aldehydes are melamine and urea. The reaction takes place in the usual molar ratios, for instance in the usual formaldehyde molar ratio of 1:1.5 to 1:4 in the case of urea resins and in a formaldehyde molar ratio between 1:1.5 and 1:6 in the case of melamine resins. The aminoplast-forming condensation products are preferably used in a partially or completely alkylated (or alcohol-modified) form. The products of etherification of the low semi-ethers of glycol and diglycol, such as ethylene-glycol-monoethyl-ether and ethyl diglycol, with methylol melamine, as previously described in Austrian patent specification 180,407, have also proved satisfactory in the present case. The highest preference is given to low-molecular products of condensation of melamine with formaldehyde in a melamine/formaldehyde molar ratio between 1:4 and 1:6, which have been almost completely etherified with methanol. Other suitable compounds are ethers, partially esterified with dicarboxylic acids of polymethylol compounds containing nitrogen, as obtained for instance by ester radical exchange reactions of hexamethoxymethyl-melamine with adipic acid.

We particularly prefer to use those water-thinnable melamine resin aldehyde condensation products which are obtained when aminotriazine and aldehyde condensation products etherified with alcohol and containing at least one mole of volatile alcohol residue in the ether linkage are reacted by heating with aliphatic hydroxycarboxylic acid esters, and which have been described in French patent specification 1,544,219.

Preferred are binders consisting of 90 to 70% by weight of new polyether ester carboxylic acid resins in connection with component II namely aminoplastforming resp. phenoplastforming condensation product in quantities of 10 to 30% by weight based on the solid content.

When the resin combinations (component I and II) of this invention are used as binding agents for stoving lacquers, an advantageous effect is obtained by the addition of compounds containing hydroxyl groups, more particularly amines and preferably polyamines containing hydroxyl groups. In a particular embodiment the binders of this invention contain in their aqueous solution as strong organic nitrogen bases at least one compound represented by the general formula $$R_3-O-\underset{\underset{H}{|}}{\overset{\overset{R_2}{|}}{C}}-\underset{\underset{H}{|}}{\overset{\overset{H}{|}}{C}}\diagdown \underset{\underset{R_1}{|}}{\overset{\overset{H}{|}}{N}}-\underset{\underset{H}{|}}{\overset{|}{C}}-(Y)_x-\underset{\underset{H}{|}}{\overset{|}{C}}-\underset{\underset{R'_1}{|}}{\overset{\overset{H}{|}}{N}}\diagup \underset{\underset{H}{|}}{\overset{\overset{H}{|}}{C}}-\underset{\underset{H}{|}}{\overset{\overset{R'_2}{|}}{C}}-O-R'_3$$

in which the substituents and symbols have the following meanings:

$Y = -CH_2-, -C_2H_4-, -C_3H_6-, -C_4H_8-, -CH_2-\underset{\underset{}{|}}{\overset{\overset{R_1}{|}}{N}}-CH_2-$ $x$ means zero or a whole number between 1 and 6.

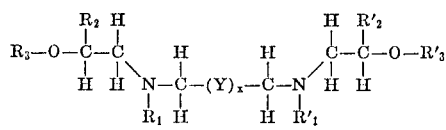

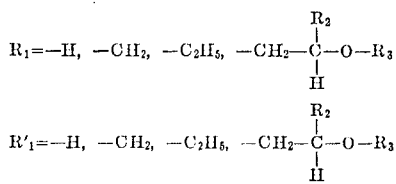

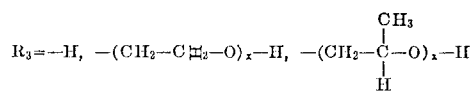

and

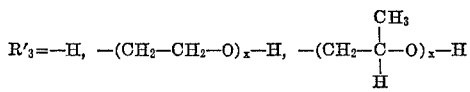

X means zero or a whole number between 1 and 6.

We prefer those polyhydroxypolyamines represented by the foregoing general formula which are characterized by complete replacement of the hydrogen atoms of polyamines by the 2-hydroxypropyl residue, more particularly the polyhydroxypolyamines obtained by complete reaction of diethylene triamine and diethylene tetramine with propylene oxide. The manufacture of the polyhydroxypolyamines referred to above is described in French patent specification 1,497,222.

For the production of binders for aqueous coatings for the electrophoretic application process an advantage is gained if the heat-curing condensation products of the kind already described above, component II that is to say phenoplasts and/or aminoplasts, are not merely added to and mixed with the resins of the present invention before neutralization, but the components are subjected to a reaction. The reaction, which can be called precondensation, generally takes place at temperature from about 100 to about 150° C., and it is necessary to carry out the reaction in a suitable way so as to ensure as far as possible that polyetherification and not esterification of the components takes place. A suitable method of carrying out the reaction consists for instance in reacting the components in the presence of a known acid catalyst for instance such as phosphoric acids, p-toluene sulphonic acid or benzoic acid, at temperatures between about 100 and about 150° C. In this process the heating is stopped at once when the acid value has decreased by about 10 units as compared with the initial acid value of the reaction mixture. This may preferably be achieved by using etherified hydrophilic, heat-curing condensation products as phenoplasts and/or aminoplasts. In order to obtain adequate ether conversion it is also advantageous to carry out the reaction under vacuum.

The binders of the present invention whereby the components I and II partly or completely are precondensation products is the most preferred employment of the present invention.

The usual methods can be used in applying the combined stoving lacquers made from the resins of the present invention to the object to be lacquered; they are more particularly suitable for lacquering sheet metal. In regard to this the lacquer has a particular advantage in that it can be deposited on the sheet metal by the electrophoretic process. The stoving of the lacquer can be carried out at temperatures of about 80 to 200 and preferably about 100 to 180° C. and during a time of about 10 to 80 and preferably about 20 to 60 minutes, depending on the stoving temperature. In practically all cases the lacquers may advantageously contain as an additional component at least one additive resin which is soluble in the lacquer system and is different from the polyether ester resin and is of a kind usually employed with stoving lacquers of this kind; compatibility has to be taken into consideration in the selection of the nature and quantity of this additive resin.

The binders used in accordance with the invention may be pigmented or unpigmented in coating agents and/or may contain fillers. They may for instance be applied to wood, metal, masonry, plaster or alternatively to iron and steel or alternatively to non-ferrous metals, with or without preliminary treatment such as passivation, phosphating, electrochemical treatment, galvanizing, tin-plating or other metalizing processes, by various methods including electrophoretic application. Pigments and/or fillers are for instance—the invention is not limited to these—iron oxide red, carbon black, lead silicochromate, strontium chromate, permanent white, micronized baryta, microtalc, colloidal chalk, diatomaceous earth, china clay, titanium dioxide, chromium oxide and others.

The use of strongly basic pigments such as zinc oxide, zinc chromate, lead carbonate, basic lead sulphate, minium or calcium plumbate, calls for accurate testing. These pigments may have a tendency towards thickening or precipitation.

To the preferred forms put into practice according to this invention belong the following products of the process, namely binders of the following compositions:

(1) 75% by weight of component I: 40% by weight of a reaction product of ethanol with an epoxy resin on the basis of 4,4'-dihydroxy diphenyl propane with an epoxy equivalent weight of 450 to 550, 30% by weight of linseed oil fatty acid, 20% by weight of styrene and 10% by weight of acrylic acid. 25% by weight of component II: p.-tert-butylphenol resol etherified with n-butanol.

(2) 75% by weight of component I: 40% by weight of a reaction product of ethanol with an epoxy resin mixture of 6% by weight of an epoxy resin on the basis of 4,4'-dihydroxy diphenyl propane with an epoxy equivalent weight of 190–220 and 4 parts by weight of an epoxy resin with an epoxy equivalent weight of 1800, 30% by weight of linseed oil fatty acid, 10% by weight of styrene, 10% by weight of 2-ethylhexylacrylate and 10% by weight of acrylic acid. 25% by weight of component II: phenol resol on the basis of 4,4'-dihydroxy diphenyl propane were a formaldehyde content of about 4 moles.

(3) 80% by weight of component I: 35% by weight of a reaction product of ethanol with an epoxy resin mixture of 6 parts by weight of an epoxy resin on the basis of 4,4'-dihydroxy diphenyl propane with an epoxy equivalent weight of 190–220 and 4 parts by weight of an epoxy resin with an epoxy equivalent weight of 1800, 35% by weight of dehydrated castor oil, 20% by weight of styrene and 10% by weight of acrylic acid. 20% by weight of component II: hexamethoxymethylamine.

(4) 80% by weight of component I: 35% by weight of a reaction product of n-butanol with a mixture of 7 parts by weight of an epoxy resin on the basis of 4,4'-dihydroxy diphenyl propane with an epoxy equivalent weight of 190 to 220 and 3 parts by weight of an epoxy resin on the basis of 4,4'-dihydroxy diphenyl propane with an epoxy equivalent weight of 1800, 35% by weight of tall oil fatty acid, 20% by weight of acrylonitrile and 10% by weight of acrylic acid. 20% by weight of component II: with butanol etherified melamine resin with a formaldehyde content of about 5 moles.

(5) 75% by weight of component I: 40% by weight of a reaction product of isononanol with a mixture of 4 parts by weight of an expoxy resin on the basis of 4,4'-dihydroxy diphenyl propane with an expoxy equivalent weight of 180–220 and 6 parts by weight of an epoxy resin on the basis of 4,4'-dihydroxy diphenyl propane with an epoxy equivalent weight of 800–1100, 30% by weight of tall oil fatty acid, 20% by weight of vinyltoluene and 10% by weight of methacrylic acid. 25% by weight of component II: p-tert-butylphenol resol with a formaldehyde content of about 2 moles.

(6) 70% by weight of component I: 30% by weight of a reaction product of n-butanol with an epoxy resin on the basis of 4,4'-dihydroxy diphenyl propane with an epoxy equivalent weight of 450–550, 60% by weight of linseed oil fatty acid and 10% by weight of maleic acid anhydride. 30% by weight of component II: phenolic resin with a formaldehyde loading of about 2 moles on the basis of 4,4'-dihydroxy diphenyl propane.

(7) 80% by weight of component: I: 30% by weight of a reaction product of isononanol with a mixture of 4 parts by weight of an epoxy resin on the basis of 4,4'-dihydroxy diphenyl propane with an epoxy equivalent weight of 180–220 and 6 parts by weight of epoxy resin on the basis of 4,4'-dihydroxy diphenyl propane with an epoxy equivalent weight of 800–1100, 30% by weight of tall oil fatty acid, 30% by weight of styrene and 10% by weight of acrylic acid. 20% by weight of component II: hexamethoxymethylmelamine.

(8) 80% by weight of component I: 40% by weight of a reaction product of isononanol with a mixture of 4 parts by weight of an epoxy resin on the basis of 4,4'-dihydroxy diphenyl propane with an epoxy equivalent weight of 180–220 and 6 parts by weight of an epoxy resin on the basis of 4,4'-dihydroxy diphenyl propane with an epoxy equivalent weight of 800–1100, 33% by weight of tall oil fatty acid, 20% by weight of styrene and 7% by weight of methacrylic acid. 20% by weight of component II: hexamethylolmelamine estherified with a mixture of ethanol and methanol.

(9) 75% by weight of component I: 35% by weight of a reaction product of ethanol with an epoxy resin mixture of 6 parts by weight of an epoxy resin on the basis of 4,4'-dihydroxy diphenyl propane with an epoxy equivalent weight of 190–220 and 4 parts by weight of an epoxy resin with an epoxy equivalent weight of 1800, 35% by weight of linseed oil fatty acid, 20% by weight of 2-ethyl hexyl acrylate and 10% by weight of acrylic acid. 25% by weight of component II: Xylenol resol with a formaldehyde loading of about 2 moles.

When producing the binders according to the invention the following embodiments are preferred:

(10) The mixture of component I: 70 parts by weight of a resin of the following composition: 35% by weight of a reaction product of ethanol with an epoxy resin mixture of 6 parts by weight of an epoxy resin on the basis of 4,4'-dihydroxy diphenyl propane with an epoxy equivalent weight of 190–220 and 4 parts by weight of an epoxy resin with an epoxy equivalent weight of 1800, 35% by weight of linseed oil fatty acid, 20% by weight of 2-ethyl hexyl acrylate and 10% by weight of acrylic acid and component II: 30 parts by weight of phenolic resin on the basis of 4,4'-dihydroxy diphenyl propane with a formaldehyde loading of about 2 moles.

(11) The mixture of (a) 70 parts by weight of component I of the following composition: 35% by weight of a reaction product of ethanol with an epoxy resin mixture of 6 parts by weight of an epoxy resin on the basis of 4,4'-dihydroxy diphenyl propane with an epoxy equivalent weight of 190–220 and 4 parts by weight of an epoxy resin with an epoxy equivalent weight of 1800, 35% by weight of linseed oil fatty acid, 20% by weight of 2-ethyl hexyl acrylate and 10% by weight of acrylic acid and 30 parts by weight of component II namely p.-tert-butylphenol resol etherified with butanol.

(12) The mixture of (a) 80 parts by weight of component I of the following composition: 35% by weight of a reaction product of ethanol with an epoxy resin mixture of 6 parts by weight of an epoxy resin on the basis of 4,4'-dihydroxy diphenyl propane with an epoxy equivalent weight of 190–220 and 4 parts by weight of an epoxy resin with an epoxy equivalent weight of 1800, 35% by weight of linseed oil fatty acid, 20% by weight of 2-ethyl hexyl acrylate and 10% by weight of acrylic acid and 20 parts by weight of component II namely hexamethylmelamine.

The viscosities of all produced and used binders should be in the range of 110–800 cp. measured as 50% by weight ethyleneglycolmonobutylether solution at 20° C.

Prepared embodiments for the binder on the basis of pre-condensates:

(1 P.) the pre-condensate of 300 g. p.-tert.-butylphenol resol etherified with butanol (as component II) and (as component I) 700 g. of an epoxy ether ester of the following composition:

35% by weight of a reaction product of n-butanol and a mixture of 6 parts by weight of an epoxy resin on the basis of 4,4'-dihydroxy diphenyl propane an epoxy equivalent weight of 190–220 and 4 parts by weight of an epoxy resin on the basis 4,4'-dihydroxy diphenyl propane with an epoxy equivalent weight of 1800 reacted with 35% by weight of linseed oil fatty acid
10% by weight of styrene
10% by weight of 2-ethylhexylacrylate and
10% by weight of acrylic acid.

(2 P.) The pre-condensation product consisting of 300 g. phenolic resin on the basis of 4,4'-dihydroxy diphenyl propane with a formaldehyde loading of about 4 moles (as component II) with 700 g. of polyether ester according to figure 1 P (as component I).

(3 P.) The pre-condensation product of 300 g. phenolic resin on the basis of xylenol with a formaldehyde loading of about 2 moles (as component II) with 700 g. of polyether ester according to figure 1 P (as component I).

(4 P.) The pre-condensation product of 250 g. hexamethoxymethylmelamine (as component III) and 750 g. of polyether ester according to figure 1 P (as component I).

(5 P.) The pre-condensation product of 300 g. phenolic resin according to 3 P. (as component II) and 700 g. of a polyether ester as under figure 1 P, however, instead of acrylic acid now containing methacrylic acid as the copolymer (as component I).

(6 P.) The pre-condensation product of 300 g. of phenolic resin according to figure 3 P (as component II) and 700 g. of a polyether ester as under figure 1 P, however, instead of 10% by weight of 2-ethylhexylacrylate now containing 10% by weight of acrylonitrile (as component I) as the copolymer. The pre-condensates 1 P to 6 P are preferred for the use as binders for electrophoretic deposition for aqueous coatings, with triethylamine, diisopropanolamine, diethylamine, dimethylethanolamine, ammonia alone or in mixture, completely or partly neutralized in order to convert the binder into the water dilutable stage. The present invention is illustrated by the following examples, which, however, should not be interpreted as limiting the scope of this invention.

EXAMPLE 1

500 g. of an epoxide resin obtained in a known manner by condensation of Bisphenol A with epichlorohydrin in an alkaline medium and having an epoxide equivalent weight of 450 to 525 and a softening point of 65 to 75° C. is dissolved in a mixture of 1000 g. of ethyl alcohol and 500 g. of xylene. To this solution is added a mixture of 100 g. of ethyl alcohol and 1 g. of a 40% by weight ether solution of boron trifluoride. The solution is boiled under reflux for one hour. The solution is then concentrated under vacuum until no further distillate passes over when the internal temperature is 140° C. 560 g. of fatty acid of linseed oil and 2 ml. of triphenyl phosphite are added to the residue. The material is heated to between 230 and 240° C. and kept at this reaction temperature until the acid value has fallen to 7. The resin is then thinned with the same quantity of ethyleneglycolmonoethylether. A mixture of 380 g. of styrene, 150 g. of acrylic acid, 20 g. of di-tertiary butyl peroxide and 5 g. of lauryl mercaptan is added to this solution at 140° C. during a period of 2.5 hours. The mixture is kept at 140° C. until the solid content has reached 60% by weight (1 hour 110° C.). The material is concentrated under vacuum until the solid content is 80% by weight. 500 g. of the resin solution (component I) are mixed with 185 g. of a phenolic resin (component II) on the basis of Bisphenol A, the production of which is described below. To the mixture is added so much diethanolamine that the mixture is unlimited water dilutable. The binder is suitable for the production of water dilutable primers whereby strong anticorrosive coatings are obtained by spraying or dipping. The stoving temperature is 30 minutes at 180° C.

Production of the phenol resol

To 400 g. of 30% by weight aqueous formaldehyde solution are added 12 g. of 45% by weight of sodium carbonate solution. Added are then 210 g. of 4,4'-dihydroxy diphenyl propane whereby we have to take care that the temperature does not rise above 40° C. The mixture is kept at 50° C. for 5 hours and afterwards 170 g. of n-butanol and 70 g. of toluene are added. After mixing 7.5 g. of 50% by weight of sulphuric acid and 15 g. of water are added. The pH is adjusted by adding a mixture of 0.4 g. 85% by weight phosphoric acid and 0.8 g. of water to 4 to 4.5. After thorough mixing the water settles and is separated. To the mix 80 g. of n-butanol and 150 g. of water are added, well mixed, and again the water settles and is separated. A new 100 g. of n-butanol are added to the residue and the resin is dehydrated at 110° C. with recycling of the dehydrated butanol. After removal of the water the resin is concentrated by vacuum distillation to a solids content of 70% by weight.

EXAMPLE 2

The operation is carried out as in Example 1, but for polymerization the resin (component I) is thinned with xylene instead of ethyleneglycolmonoethylether. After the solids content of 60% by weight has been attained the xylene is completely removed by vacuum distillation and the resin is thinned with ethylene-glycolmonoethylether so that the solids content is 80% by weight. The mixing of component I with phenolic resin (component II) is carried out according to Example 1. The binder obtained is suitable for primers for electrophoretic deposition. The stoving temperature is 30 minutes at 180° C. The result are strong anticorrosive coatings.

EXAMPLE 3

The resin (component I) obtained as in Example 2 is mixed with a phenol resin ether carboxylic acid (component II) described in the Belgian patent specification 724,-923 of the Dec. 4, 1968, Example 22, in the ratio 7:3 based on the solids. The manufacture of the phenol resin carboxylic acid is also described hereinafter. The resin mixture is neutralized with triethyl amine and thinned with water so that the solids content is 40% by weight. The paste is then ground in a ceramic ball mill with Kronos RN 59 (Titangesellschaft) titanium dioxide so that the pigment to binding agent ratio is 0.3:1. The paste is then thinned with water so that the solids content is 10% by weight. The solution is poured into a steel tank measuring 10 x 10 x 18 cm., in which passivated steel plates (Bonder 1021 Metallgesellschaft) are then coated by application of direct current of 110 volts. The plates are then stoved for 30 minutes at 170° C., and extremely hard and resistant coatings are obtained.

Manufacture of the etherified phenol resol 686.5 g. of p-tertiary butyl phenol resol is dehydrated in a vacuum up to 90° C., and
1650.0 g. of n-butanol and
835.0 g. of toluene are then added. The mixture is heated to boiling point and the water is removed by azeotropic distillation, the solvent mixture being returned to the reaction vessel. After about 40 g. of water have been removed,
8.0 g. of 85% by weight of phosphoric acid are added and the azeotropic distillation is continued until no more water passes over. The acid is then neutralized with calcium hydroxide added in solid form. The product is concentrated under vacuum up to a temperature of 110° C. and then filtered. The solids content amounts to about 92% by weight.

Manufacture of the phenol resin carboxylic acid 340 g. of etherified phenol resol obtained as described above and
70 g. dimethylol propionic acid are mixed and heated under vacuum to between 150 and 160° C. and kept at this temperature until about 100 g. of distillate (butanol) have passed over. The product then has a viscosity of 150 cp. when measured in a 1:1 butyl glycol solution at 20° C., and an acid value of 90. The product is thinned with ethyleneglycolmonoisopropylether so that the solid content is 80% by weight. The neutralized resin can be thinned with water to an unlimited extent when the pH is 8.5.

EXAMPLE 4

The resin (component I) obtained as in Example 2 is mixed in the ratio 8:2 with an anionic melamine resin (component II) according to Example 2 as described in the published priority document of French patent specification 1,544,219, that is to say in German patent application R 45,195. This mixture is pigmented as described in Example 2 of this invention and electrophoretically deposited as also described there. The plates are stoved for 30 minutes at 150° C. Relatively light colored hard coatings are obtained.

Manufacture of the anionic melamine resin 390 g. of hexamethoxymethyl melamine,
150 g. of n-butanol and
140 g. of glycolic acid butyl ester are mixed and 0.1 g. of p-toluene sulphonic acid is added as a catalyst. The mixture is heated and kept at 100 to 110° C. until no more distillate passes over. A vacuum is then applied and the unreacted alcohol and ester are distilled off. 100 ml. of 5 N NaOH and 100 ml. of water are then added. The material is boiled under reflux for one hour. The water is then removed by azeotropic distillation with benzene as an entrainer. The benzene is then distilled off under vacuum and a solution of 30 g. of oxalic acid in 100 g. of acetone is added to the mixture at 30° C. The material is thoroughly stirred and then filtered. The resin is then neutralized with triethyl amine. It can be thinned with water to an unlimited extent and can be used for electrophoretic lacquering.

EXAMPLE 5

160 g. of the resin (component I) described in Example 2 is made; in this operation, however, the resin is not thinned with ethyleneglycolmonobutylether as described there, but 43.5 g. of the etherified phenol resole (component II) of which the manufacture is described in Example 4 is added. 1 g. of a 40% by weight of isobutanol solution of 80% by weight phosphoric acid is added and the mixture is heated to 140° C. under vacuum and kept at this temperature until the acid value has reached about 42 and the viscosity when measured in an ethyleneglycol-monobutylether at 20° C. is 150 cp. The resin is then thinned to 80% by weight with diacetone alcohol and neutralized to a pH value of about 8 with diisopropanol amine. It is suitable as a sole binding agent for electrophoretic lacquering.

EXAMPLE 6

160 g. of the resin (component I) described in Example 2 is made; the resin however is not thinned with ethyleneglycolmonobutylether as described there, but 40 g. of hexamethoxymethyl melamine (component II) are added to and mixed with it. 0.1 g. of p-toluene sulphonic acid is added and the mixture is heated to 120° C. under vacuum. As soon as the acid value has dropped to 35, the resin is thinned with isopropyl glycol so that the solids content is 80% by weight and the resin is neutralized with diisopropanol amine. The resin is suitable for electrophoretic lacquering to obtain light colored coating.

The binders obtained by mixing component I with phenolic resins (as component II) yield coatings which after stoving, are generally superior to those made with aminoplast combinations described in this invention, particularly as regards their anticorrosive properties, and are therefore preferred.

Coatings obtained by stoving the binders at 170°–190° C. are preferred. For the electrophoretic deposition mixtures of component I with phenoplasts respectively aminoplasts (as component II) are less suitable since there is the danger that the concentration of the nonionic component II increases in the bath. For the electrophoretic deposition the pre-condensates of components I and II are preferred respectively such phenolic resols or aminoplasts as component II in the mixture which carry an anionic group. Phenolic resols as component II are more suitable for the production of binders for use in highly anti-corrosive primers.

While this invention has been described with reference to certain specific embodiments, it will be recognized by those skilled in the art that many variations are possible without departing from the scope and spirit of the invention.

I claim:

1. A method of making a binder for aqueous coatings comprising vinyl-modified synthetic resin I neutralized with a basic compound selected from the group consisting of ammonia and a strong organic nitrogen base and heat curable water dilutable or at least hydrophilic low molecular aldehyde condensation products II, characterized by that component I is made by etherification of
   (a) compounds which contain epoxide groups and are represented by the general formula:

whereby $n$ is the integer 1 to 5 with
   (b) compounds selected from the group consisting of saturated primary and secondary monohydric aliphatic alcohols having 3 to 20 C atoms, individually or in a mixture, by heating and
   (c) the etherification products are esterified with an unsaturated aliphatic monocarboxylic acid with 6 to 20 C atoms or with a mixture of such acids, and
   (d) the esterification products are reacted by heating with such quantities of compounds selected from the group consisting of $\alpha,\beta$-ethylenically unsaturated mono- and polycarboxylic acids, anhydrides of these acids, and semiesters obtained by reaction of these acids with monoalcohols having 1 to 4 C atoms, individually or in a mixture in the presence of other vinyl or vinylidene compounds, so that the reaction products have an acid value of at least 25, and
   (e) the reaction products containing carboxyl groups are subsequently treated with such quantities of basic compounds selected from the group consisting of ammonia and strong organic nitrogen bases that the products are completely or partly neutralized and are sufficiently capable of being dispersed in water or thinned with water.

2. A binder for aqueous coatings when prepared in accordance with the method of claim 1.

3. A method according to claim 1 wherein the etherification of step (b) takes place in the presence of a catalyst.

4. A method according to claim 1 wherein the residual hydroxyl groups of the esterification products of step (c) are blocked with compounds selected from the group consisting of acid anhydrides, mono- and poly-isocyanates.

5. A method according to claim 1, wherein the unsaturated aliphatic monocarboxylic acid of step (c) contains a plurality of ethylenic double bonds.

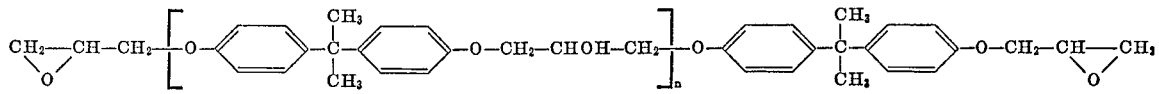

References Cited

UNITED STATES PATENTS

| | | | |
|---|---|---|---|
| 3,563,929 | 2/1971 | Guldenpfennig | 260—23 |
| 3,264,370 | 8/1966 | Ott et al. | 260—834 |
| 3,502,557 | 3/1970 | Yurcheschen et al. | 204—181 |
| 3,563,926 | 2/1971 | Lackner | 260—19 |

DONALD E. CZAJA, Primary Examiner

R. W. GRIFFIN, Assistant Examiner

U.S. Cl. X.R.

117—161 UN; 161 ZB, DIG. 7; 204—181; 260—20, 21, 29.2 EP, 29.2 N, 29.2 TN